United States Patent [19]

Burke

[11] 4,342,463
[45] Aug. 3, 1982

[54] SPRING SEAL
[75] Inventor: John A. Burke, Rocky River, Ohio
[73] Assignee: Green, Tweed & Co., Inc., North Wales, Pa.
[21] Appl. No.: 197,443
[22] Filed: Oct. 16, 1980
[51] Int. Cl.³ .................... F16J 15/00; F16J 15/24
[52] U.S. Cl. .................... 277/177; 277/188 R
[58] Field of Search ............ 277/188 R, 188 A, 177

[56] References Cited
U.S. PATENT DOCUMENTS
3,582,094  6/1971  Whittaker ................... 277/177
3,765,690  10/1973  Sievenpiper ............... 277/177
4,229,013  10/1980  Burke et al. ............. 277/188 R Primary Examiner—William Price
Attorney, Agent, or Firm—Seidel, Gonda, Goldhammer & Panitch

[57] ABSTRACT

A sealing ring firmly grips a movable piston, performs the normal sealing function, and when pressure is released on the piston the sealing ring pulls back on the piston so as to retract the piston. The sealing ring is designed so as to fit in a conventional seal or "O" ring groove without any modification of the groove.

2 Claims, 3 Drawing Figures

SPRING SEAL

RELATED CASE

This application is related to my pending application Ser. No. 53,883 entitled SPRING SEAL and filed July 2, 1979 as now U.S. No. 4,299,013.

BACKGROUND

In devices such as disk brakes, a lining is moved into contact with the brake disk by way of a piston. It is conventional to provide a spring for returning the piston to its original position. Under a number of circumstances, the springs do not perform their intended function whereby the linings frictionally contact the brake disk even when no pressure is applied to the pistons.

The present invention solves that problem by providing a sealing ring which retracts the piston for a predetermined distance which is sufficient to prevent the linings from remaining in contact with the brake disk. For relevant prior art, see U.S. Pat. No. 4,058,084 wherein the groove for the sealing ring is non-conventional and/or a spring is provided in the groove with the sealing ring. The sealing ring of the present invention is designed to be used in a standard groove with the sealing ring performing the added function of acting like a return spring. Also see U.S. Pat. No. 3,771,801 wherein the seal disclosed therein bears a superficial resemblance to the seal of the present invention.

SUMMARY OF THE INVENTION

In accordance with the present invention, a seal assembly is provided and comprises an annular sealing ring of resilient deformable plastic material and without a mating back-up ring. The sealing ring has a radially disposed side face which defines the pressure side of the assembly. The sealing ring has an inner peripheral surface defined by two discrete portions. The first portion converges toward said side face with a taper at an angle of between 5° and 15° with respect to the axis of the sealing ring. The second portion is contiguous with the first portion and is an angled surface between 25° and 40° with respect to a radius of the sealing ring. The second portion intersects a side face parallel to said first mentioned side face.

It is an object of the present invention to provide a novel seal assembly wherein a sealing ring performs a dual function of acting as a seal and acting as a return spring.

It is another object of the present invention to provide a novel seal for use in a stationary portion of a device and capable of retracting a piston for a short distance when pressure on the piston is relesed, with the seal being adapted for use in a conventional seal groove.

It is another object of the present invention to provide a seal which solves a problem in connection with dragging brakes in a manner which is simple, inexpensive and reliable.

It is another object of the present invention to provide a seal capable of retracting a brake piston from contact with the brake lining material due to a low order of hydraulic pressure resulting from an elevated master cylinder or reservoir location, commonly known as "head" pressure.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawings in detail, wherein like numerals indicate like elements, a disk brake represents a typical environment in which the seal of the present invention may be incorporated. The brake is conventional and per se forms no part of the present invention.

The brake includes a housing 12 having a disk between a pair of linings. Each lining abuts a piston. Each piston may have a retraction spring coaxial therewith for retracting the pistons and their associated linings in the absence of pressure but such springs are unnecessary.

Fluid pressure may be applied to the righthand end of piston 14 by way of fluid passage in the housing 12. A seal 16 is provided in a stationary portion of the housing 12 for sealing contact with the outer periphery of piston 14.

Figure 1:
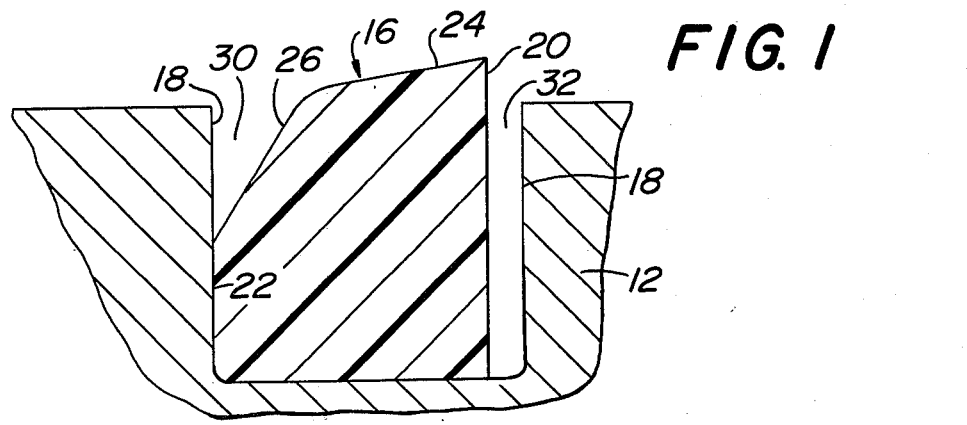
FIG. 1 is an enlarged detail view showing the seal assembly in section and mounted in a groove before contact between the seal and piston.

Referring to FIG. 1, the housing 12 is provided with a standard or special seal gland or groove 18. In many applications for the present invention the depth of groove 18 exceeds its axial length. Within the groove 18, there is provided the seal 16 of the present invention. The seal 16 is a sealing ring having a radially disposed side face 20 on the pressure side. That is, surface 20 is the surface exposed to the pressure applied to the piston 14. The opposite side face 22 is parallel to face 20. The inner periphery of the sealing ring is defined by two contiguous surfaces, namely surfaces 24 and 26. Surface 24 converges toward the surface 20 at an angle of between 5° and 15° with respect to the axis of the sealing ring. The preferred taper is about 10°. I have found that a taper of less than about 5° for surface 24 is undesirable since there is insufficient gripping of the piston by the sealing ring. I have found that a taper in excess of 15° is undesirable since the sealing ring is virtually locked to the piston.

The intersection of surfaces 24 and 26 is rounded as shown in FIG. 1. Surface 26 extends at an angle of between 25° and 40° with respect to a radius of the sealing ring. The preferred angle for surface 26 is between 30° and 37° with respect to a radius on the sealing ring. The axial thickness of the seal 16 is less than the width of the groove 18 thereby leaving a space 32 on the pressure side of the groove 18. The bottom corners of the groove 18 may be rounded if desired. Surface 26 and the adjacent side of groove 18 cooperate to define a triangular space 30.

Figure 2:
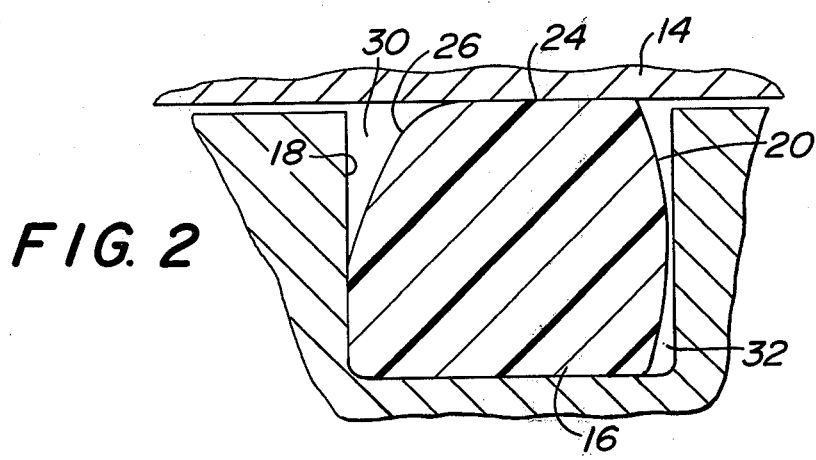
FIG. 2 is a view similar to FIG. 1 but shows the orientation of components when the inner peripheral surface of the sealing ring contacts the outer peripheral surface of a piston.

The inner diameter of the sealing ring is smaller than the outer diameter of the associated piston 14. When piston 14 is moved so as to be coaxial with and surrounded by the sealing ring, the sealing ring deforms to the shape as illustrated in FIG. 2. In FIG. 2, it will be noted that the sealing ring has been deformed so as to bulge surface 20 outwardly into the space 32. Also, surface 26 has been deformed so as to make the space 30 smaller but still of the same general shape. The preferred squeeze level range is 11 to 21%.

Figure 3:
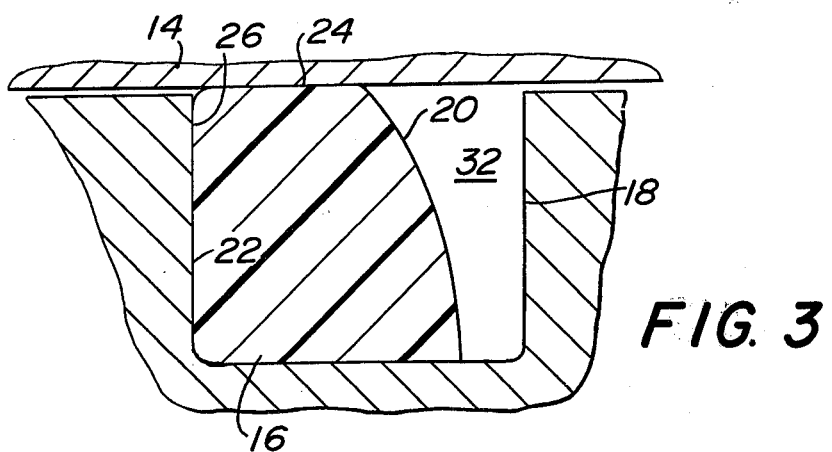
FIG. 3 is a view similar to FIG. 2 showing the orientation of the components when full pressure has been applied to the piston.

When pressure is applied to the piston 14, and it moves from right to left in FIGS. 2 and 3, the sealing ring deforms to the shape shown in FIG. 3. Space 30 has disappeared while space 32 is substantially larger. Surfaces 22 and 26 are now aligned. When the pressure is released, the sealing ring assumes the shape as shown in FIG. 2 and retracts the piston 14 from left to right. The amount of retraction of piston 14 by the sealing ring is a function of fluid pressure applied to the piston. The sealing ring retracts the piston 14 between 0.010 inch when the pressure is 50 pounds per square inch and 0.022 inch when the pressure is 400 pounds per square inch. Surprisingly, increasing the pressure up to 600 pounds per square inch or higher had no effect on the amount of retraction of the piston by the sealing ring.

The preferred material for sealing 32 is a rubber material from the ethylene-propylene family for compatability with automotive brake fluids. Other resilient rubbers and elastomeric materials can be used as dictated by fluid choice or extreme temperature conditions. Of importance is the selection of a highly resilient rubber compound with minimal compression set characteristics.

The space 32 should be sufficient to allow thermal expansion of the seal assembly at the maximum operating temperatures. In order to facilitate ease of assembly and to facilitate distortion of the sealing ring, I prefer that the space 32 have a width of 5 to 15% of the seal groove axial length.

In a preferred embodiment of the sealing ring, the ring had an outer nominal diameter of 3.250 inches with the radial length of surface 20 in FIG. 2 being a nominal radial length of 0.200 inch while surface 22 had a radial length of 0.09. When the sealing ring is distorted radially outwardly by the piston 14 as shown in FIG. 2, surface 20 along a radius was decreased by approximately 0.025 to 0.030 inch. Thus, the length of surface 20 along a radius decreased between about 8 to 14% due to deformation by the piston 14 when comparing FIGS. 1 and 2. These demensions and percentages are by way of illustration and not by way of limitations.

A separate spring is not required and the groove 18 is a standard seal groove requiring no special machining or shape. The seal assembly of the present invention may be a male or female so long as the groove containing the same is stationary.

The present invention may be embodied in other specific forms without departing from the spirit or essential attributes thereof and, accordingly, reference should be made to the appended claims, rather than to the foregoing specification, as indicating the scope of the invention.

I claim:

1. A one-piece seal comprising: an annular sealing ring of resilient deformable plastic material, said sealing ring having a radially disposed side face defining a pressure side of the ring, said sealing ring having its inner peripheral surface defined by two contiguous portions, the first portion converging inward toward said side face with a taper of between 5° and 15° with respect to the axis of the sealing ring, the second portion being an angled surface extending outwardly from said first portion at an angle of between 25° and 40° with respect to a radius on said sealing ring, the opposite side faces of the ring are parallel, the side face opposite said pressure side directly intersecting said second portion.

2. A seal in accordance with claim 1 wherein said second portion terminates at a location approximately at the middle of the radial thickness of the sealing ring, whereby the radial length of the pressure side face is about twice the length of the opposite side face.

* * * * *